United States Patent
Smith et al.

(10) Patent No.: US 12,254,050 B2
(45) Date of Patent: Mar. 18, 2025

(54) ORIGIN DETECTION FOR WEBSITE COOKIES

(71) Applicant: ObservePoint, Inc., Pleasant Grove, UT (US)

(72) Inventors: David Smith, Pleasant Grove, UT (US); Israel Carvajal, Pleasant Grove, UT (US); Robert Mount, Pleasant Grove, UT (US); Clinton Eagar, Pleasant Grove, UT (US); Michael Maziarz, Pleasant Grove, UT (US)

(73) Assignee: ObservePoint, Inc., Pleasant Grove, UT (US)

( * ) Notice: Subject to any disclaimer, the term of this patent is extended or adjusted under 35 U.S.C. 154(b) by 108 days.

(21) Appl. No.: 18/332,644

(22) Filed: Jun. 9, 2023

(65) Prior Publication Data

US 2024/0411823 A1 Dec. 12, 2024

(51) Int. Cl.
| | |
|---|---|
| *G06F 15/16* | (2006.01) |
| *G06F 16/951* | (2019.01) |
| *H04L 67/02* | (2022.01) |
| *H04L 67/146* | (2022.01) |

(52) U.S. Cl.
CPC ............ *G06F 16/951* (2019.01); *H04L 67/02* (2013.01); *H04L 67/146* (2013.01)

(58) Field of Classification Search
CPC .. G06F 16/951; G06F 21/6263; G06F 16/128; G06F 2201/84; G06F 16/9024; H04L 67/02; H04L 67/146
See application file for complete search history.

(56) References Cited

U.S. PATENT DOCUMENTS

| | | | |
|---|---|---|---|
| 7,546,370 B1 | 6/2009 | Acharya et al. | |
| 8,365,062 B2 | 1/2013 | Seolas et al. | |
| 8,578,036 B1 | 11/2013 | Holfelder et al. | |
| 9,251,548 B1 * | 2/2016 | Garrity | G06T 1/00 |
| 9,330,179 B2 | 5/2016 | Sun et al. | |
| 10,013,577 B1 * | 7/2018 | Beaumont | H04L 63/102 |
| 10,534,749 B1 * | 1/2020 | Miah | G06F 16/128 |
| 11,521,137 B2 * | 12/2022 | Prismon | G06F 16/9027 |
| 2005/0066037 A1 * | 3/2005 | Song | G06F 16/95 |
| | | | 709/227 |

(Continued)

OTHER PUBLICATIONS

"Cookiepedia—All About Cookies", Retrieved from https://www.cookielaw.org/cookiepedia/, Retrieved on Sep. 11, 2023, pp. 2.

(Continued)

*Primary Examiner* — Suraj M Joshi
*Assistant Examiner* — Hao H Nguyen
(74) *Attorney, Agent, or Firm* — Workman Nydegger (57) ABSTRACT

A computer system for origin detection for webpage cookies loads a webpage. Loading the webpage causes a browser to store one or more cookies. The computer system creates a first cookie snapshot of the one or more cookies and a first initiator snapshot of one or more initiators for each cookie. The computer system then generates, from the first cookie snapshot and the first initiator snapshot, an initiator directed acyclic graph. Further, the computer system displays information, from the initiator directed acyclic graph, on a link between a particular cookie and a particular initiator.

20 Claims, 6 Drawing Sheets

(56) References Cited

U.S. PATENT DOCUMENTS

| | | | | |
|---|---|---|---|---|
| 2005/0216845 | A1* | 9/2005 | Wiener | G06F 16/951 |
| | | | | 715/205 |
| 2008/0052775 | A1* | 2/2008 | Sandhu | G06F 21/6263 |
| | | | | 726/14 |
| 2009/0024583 | A1* | 1/2009 | Jaiswal | G06F 16/9535 |
| 2011/0093790 | A1* | 4/2011 | Maczuba | G06F 16/9574 |
| | | | | 715/745 |
| 2016/0110261 | A1* | 4/2016 | Parab | G06F 16/174 |
| | | | | 707/692 |
| 2016/0330237 | A1* | 11/2016 | Edlabadkar | H04L 63/1475 |
| 2017/0078415 | A1* | 3/2017 | Wang | G06Q 30/02 |
| 2017/0093917 | A1* | 3/2017 | Chandra | H04L 63/20 |
| 2017/0277907 | A1* | 9/2017 | Dang | G06F 16/9024 |
| 2017/0308793 | A1* | 10/2017 | Prismon | G06N 5/022 |
| 2018/0260281 | A1* | 9/2018 | Monk | G06F 3/065 |
| 2019/0087480 | A1* | 3/2019 | Palanciuc | G06Q 30/0269 |
| 2021/0141791 | A1* | 5/2021 | Nawathe | G06F 16/24575 |
| 2021/0149982 | A1 | 5/2021 | Jones et al. | |
| 2021/0181931 | A1* | 6/2021 | Xu | G06F 3/04847 |
| 2021/0382949 | A1 | 12/2021 | Yastrebenetsky et al. | |
| 2023/0134223 | A1 | 5/2023 | Busha et al. | |
| 2023/0168995 | A1 | 6/2023 | Retnasaba et al. | |
| 2023/0229319 | A1* | 7/2023 | Klein | G06F 3/0619 |
| | | | | 711/113 |
| 2023/0385304 | A1* | 11/2023 | Pogde | G06F 16/134 |
| 2024/0330982 | A1* | 10/2024 | Van Erlach | G06Q 30/0201 |

OTHER PUBLICATIONS

"Free Cookie Checker Tool for Websites", Cookieserve, Retrieved from https://www.cookieserve.com/, Retrieved on Sep. 11, 2023, pp. 1-4.

"How to Find the Source of a Cookie", Retrieved from https://help.observepoint.com/article/457-how-to-find-the-source-of-a-cookie, Nov. 4, 2022, pp. 1-2.

* cited by examiner

ORIGIN DETECTION FOR WEBSITE COOKIES

BACKGROUND

As computers have grown increasingly invasive in daily life, there has been increasing concern about protecting consumer privacy. One area of particular concern is the tracking of consumers across the internet. A common method of tracking individuals is through the use of website cookies. Website cookies have become an integral part of online browsing experiences, serving various purposes such as enhancing user convenience, personalizing content, and enabling targeted advertising. However, the widespread use of cookies has raised significant privacy concerns, particularly regarding the collection, storage, and usage of personal information without explicit user consent.

Cookies are primarily used to retain information about the user's browsing preferences and behavior. This information is used to facilitate a more tailored and efficient online experience. Cookies can be classified into different types based on their lifespan, purpose, and domain association. These include session cookies, persistent cookies, first-party cookies, third-party cookies, and tracking cookies.

While website cookies offer numerous benefits to both website owners and users, their usage has become a subject of scrutiny due to the potential privacy risks associated with them. Privacy concerns arise from the ability of cookies to track and collect user information, often without the user's explicit knowledge or consent. This has led to public debates, legal regulations, and increased user awareness about the collection and usage of personal data.

Various privacy laws and regulations, such as the General Data Protection Regulation (GDPR) in the European Union and the California Consumer Privacy Act (CCPA) in the United States, have been enacted to address these concerns. These regulations emphasize the importance of user consent, transparency, and control over personal data collection and usage. They require website owners to provide clear and comprehensive information about their use of cookies and obtain user consent before setting non-essential cookies.

Despite these efforts, challenges remain in balancing the benefits of cookies with the privacy rights of users.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include a computer system for origin detection for webpage cookies. The computer system can function as a browser and load a webpage. Loading the webpage causes a browser to store one or more cookies. The computer system can also create a first cookie snapshot of the one or more cookies. Additionally, the computer system can create a first initiator snapshot of one or more initiators for each cookie. The computer system can then generate, from the first cookie snapshot and the first initiator snapshot, an initiator directed acyclic graph. Further, the computer system can display information, from the initiator directed acyclic graph, on a link between a particular cookie and a particular initiator.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings described below.

FIGS. 3A-3C illustrates a sequence of user interfaces for origin detection for webpage cookies.

DETAILED DESCRIPTION

Disclosed embodiments provide systems and methods for scanning websites to collect and report information to website owners. For example, disclosed embodiments describe a new feature which collects and displays website cookie information in a novel way. For example, disclosed embodiments can display to a user the origin and life of a particular cookie stored by a browser. A cookie is a piece of information that persists in a user's web browser which websites and the website's vendors/tools/other use to identify repeat visitors, store user preferences, and enable various website features.

Disclosed embodiments provide website administrators with new and useful information relating to the various cookies present on a website. Generally, cookies can originate from two types of initiators: 1) server-side HTTP responses, and 2) browser-side JavaScript. In many cases, the initiators that create the cookie also have initiators themselves. In other words, a chain of initiators may work together to create the cookie or manipulate (also referred to herein as "mutate" or "set") a cookie. Once the cookie is created, various executed code can manipulate and update the cookie.

The complex process that goes into creating and manipulating a single cookie on a website (much less multiple cookies on the website) makes it very difficult for a website administrator to track the true origin of a cookie and the origin of individual changes to the cookie. As consumers have shown increasing interest in maintaining privacy and control of their personal data online and government agencies have made rules regulating privacy, it is increasingly important that website administrators have information and tools available that allow them to audit cookies on their websites.

Disclosed embodiments provide website administrators with tools for identifying the origin of a cookie and the origin of changes to the cookie. With this information, a website administrator is able to ensure compliance with privacy expectations.

Figure 1:
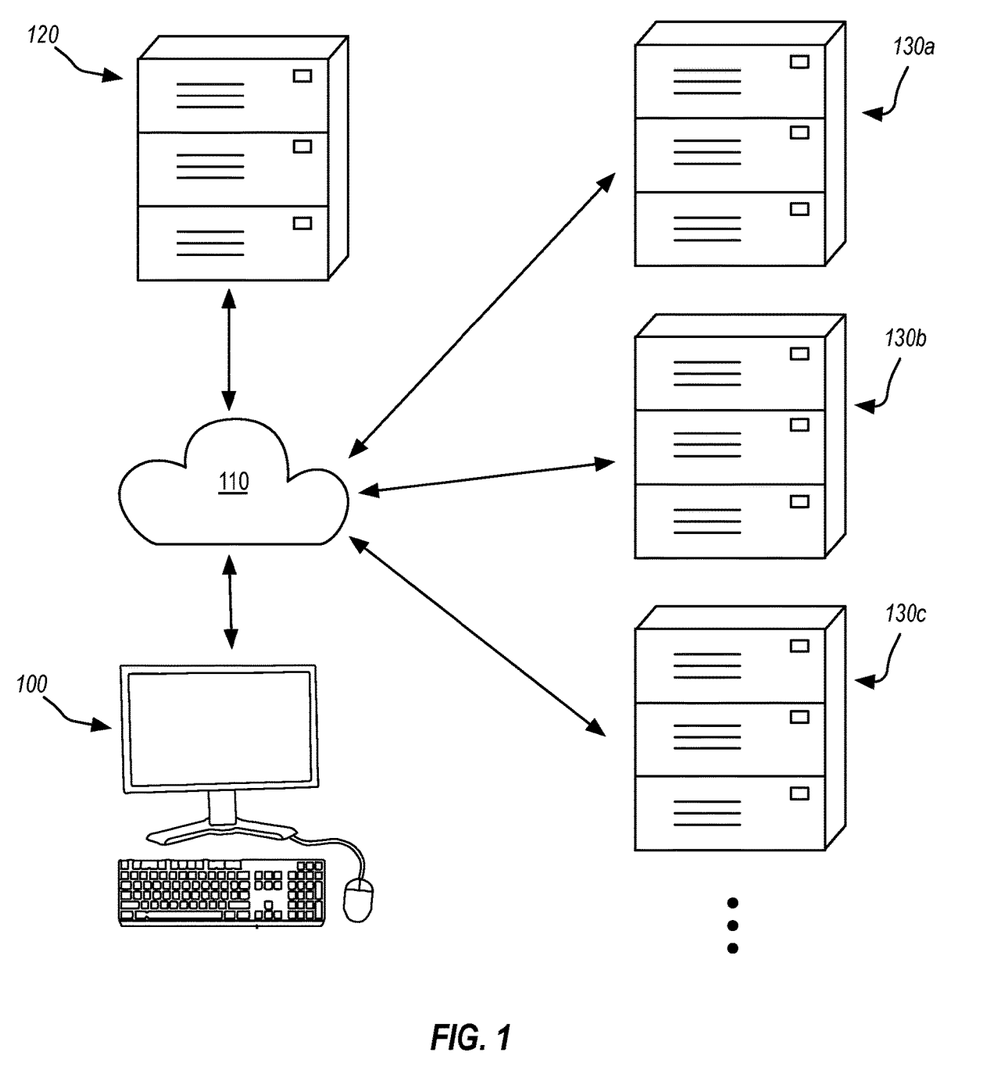
FIG. 1 illustrates a schematic of a computer system for origin detection for webpage cookies.

Turning now to the Figures, FIG. 1 depicts a schematic of an implementation of a system for gathering analytic information. As depicted, a computer system 100 accesses a network 110. The depicted computer system 100 comprises one or more processors and computer-readable media for storing computer-executable instructions, such as computer code. In this example, the network 110 comprises a conventional connection to the internet.

The computer system 100 connects to a webserver 120 through the network connection 110. The webserver 120 provides web content to the computer system 100 in the form of one or more webpages on a website. As the computer system 100 receives and renders the web content (e.g., HTML, CSS, JavaScript, Images, Video, Audio, Fonts, etc.), the computer system 100 may be instructed to access additional web content from other webservers 130(a-c). The other webservers 130(a-c) may provide additional web content. The additional web content may include initiators that create cookies or otherwise manipulate cookies.

As used herein, an "initiator" (also referred to as a "cookie initiator") comprises entities within web content that create or set cookies. These entities can include the website itself or third-party services integrated into the website. Cookie initiators are responsible for determining the purpose, content, and lifespan of the cookies. An example of a type of initiator are first-party initiators. First-party initiators refer to the website owner or operator itself. When the computer system 100 visits a website, the webserver 120 can send cookies directly to a browser executed on the computer system 100. These cookies are considered first-party cookies. First-party cookies are typically used for essential functions of the website, such as maintaining user preferences, session management, and providing personalized content. For example, a first-party cookie may be set to remember the user's login credentials, store items in a shopping cart, or remember the user's language preferences on a website.

Another example of a type of initiator is a third-party initiator. Third-party initiators are external entities that are provided by other webservers 130(a-c) that are different than the webserver 120 that hosts the website. These entities provide various services to the webserver 120, such as analytics, advertising, social media integration, or content embedding. When a website includes resources from these third-party entities, such as scripts, images, or advertisements, they can set cookies on your browser known as third-party cookies. Third-party cookies enable the other webservers 130(a-c) to track the computer system 100 across multiple websites, build user profiles, and deliver targeted advertising or personalized content. Examples of third-party initiators include advertising networks, social media platforms, web analytics services, and content delivery networks (CDNs).

Figure 2:
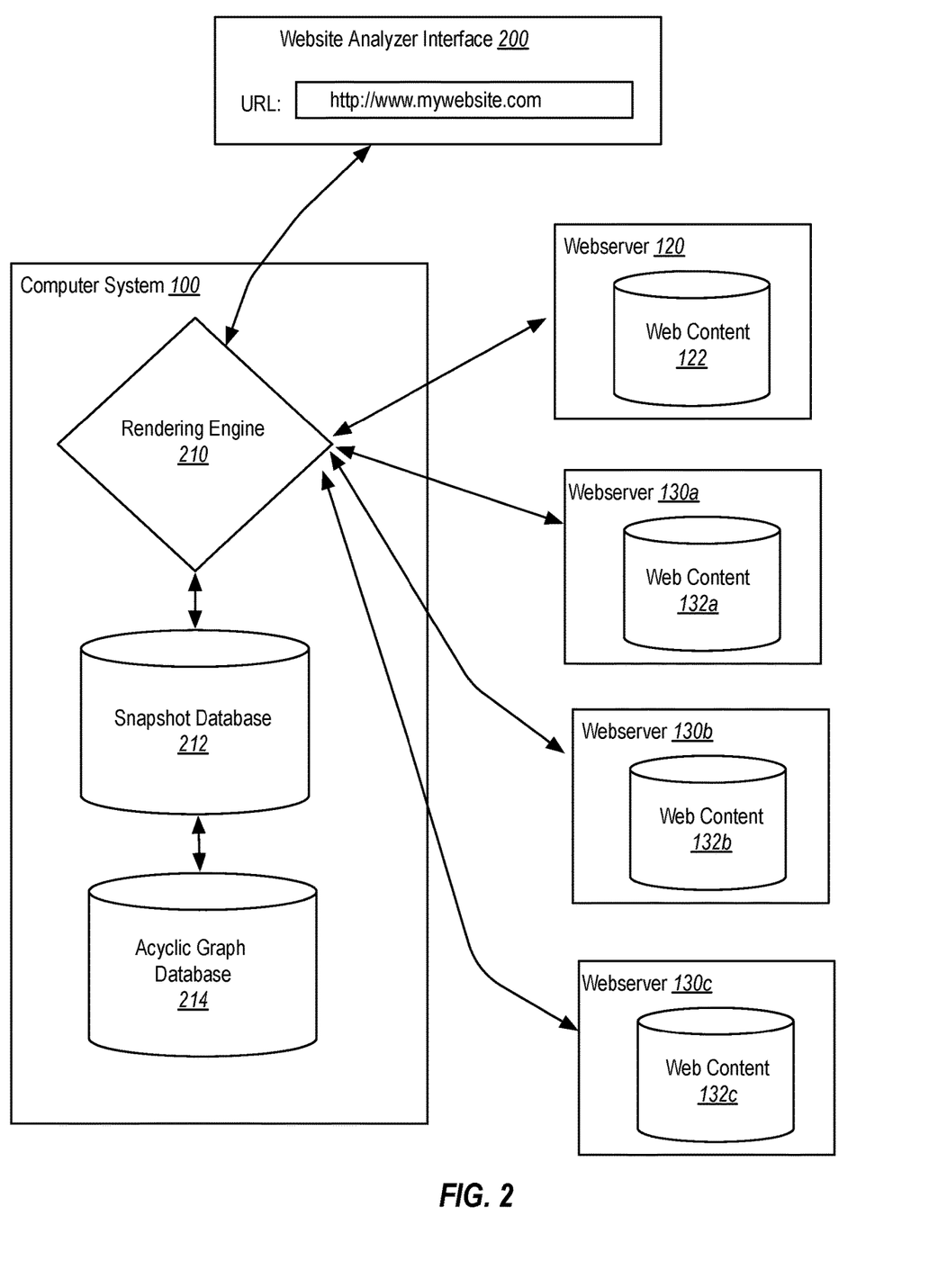
FIG. 2 illustrates another schematic of a computer system for origin detection for webpage cookies.

FIG. 2 illustrates another schematic of a computer system 100 for origin detection for webpage cookies. In at least one implementation, the computer system 100 can generate a website analyzer interface 200. The computer system 100 receives from the website analyzer interface 200 a URL to be analyzed. The computer system 100 comprises a rendering engine 210, a snapshot database 212, and an acyclic graph database 214. As used herein, an "engine" comprises computer executable code and/or computer hardware that performs a particular function. One of skill in the art will appreciate that the distinction between different modules is at least in part arbitrary and that engine may be otherwise combined and divided and still remain within the scope of the present disclosure. As such, the description of a component as being a "engine" is provided only for the sake of clarity and explanation and should not be interpreted to indicate that any particular structure of computer executable code and/or computer hardware is required, unless expressly stated otherwise. In this description, the terms "component", "agent", "manager", "service", "module", "virtual machine" or the like may also similarly be used.

The computer system 100 can access the URL provided by the website analyzer interface 200 and communicate with the webserver 120 that is associated with the URL. The webserver 120 can comprise web content 122, where the actual website content is stored. For example, the web content 122 may comprise the source code of each webpage of a website. Additionally, web content 122 may comprise multimedia content that is accessible through the webpages.

FIG. 2 shows that a user can enter a URL into a website analyzer interface 200. The website analyzer interface 200 can then communicate the URL to the rendering engine 210. In this application, a URL of "http://www.mywebsite.com" is used for exemplary purposes, but one will understand that any number of different URLs can be entered into the website analyzer interface 200. Once the rendering engine 210 has received the URL, the rendering engine 210 sends communication packets to the webserver 120 that is associated with the URL and receives response communication packets from the webserver 120. In the depicted case, the rendering engine 210 accesses http://www.mywebsite.com. Specifically, the rendering engine 210 accesses the web content 122 that is associated with the webserver 120. In at least one implementation, the rendering engine 210 can then render, using methods that are known in the art, the web content 122 that is associated with the URL. As explained above, in some embodiments, the rendering engine 210 may also render web content 132(a-c) from other webservers 130(a-c).

In at least one embodiment, the rendering engine 210 is integrated within a web browser that is executed on the computer system 100. As the rendering engine 210 renders a website, the web browser loads the webpage. Loading the webpage causes the browser to store one or more cookies. The rendering engine 210 executes within the context of a web browser and intercepts all cookie create, cookie update, and cookie delete events. During the rendering process the computer system 100 can create snapshots of cookies and snapshots of initiators and store the snapshots within the snapshot database 212.

For example, the computer system 100 can create a first cookie snapshot of the one or more cookies and create a first initiator snapshot of one or more initiators for each cookie. Both of these snapshots can then be stored within the snapshot database 212. In at least one embodiment, the first cookie snapshot and the first initiator snapshot are the same snapshot and are stored in the same dataset or file.

Each initiator can be either a server-side HTTP response or a browser-side JavaScript execution. Initiators themselves can also have initiators. The system stitches all initiator data together to give a complete view of all mutation events for all cookies and the full lineage of the initiators of those events.

In at least one embodiment, to accomplish this tracking, the rendering engine 210 receives from a cookie-creation application programming interface (API) an indication that a cookie has been created. For example, the rendering engine 210 may install interceptors in the web browser's document.cookie API and also inspects all network requests at predetermined moments during a webpage's life cycle.

In an additional or alternative embodiment, the rendering engine 210 can intercept network communications to identify cookie creating and manipulating events. For example, the rendering engine 210 can intercept a network communication made in response to code executing on the webpage. The computer system 100 can then identify, within the network communication, a fingerprint of a server-created cookie. The computer system 100 may have access to a database of various fingerprints of server-created cookies. If a fingerprint matches, the rendering engine 210 can add information about the server-created cookie to a cookie snapshot.

As a non-limiting example, GOOGLE ANALYTICS sets a cookie called "_ga". The way this commonly works is a multi-step process. First, a web page loads a Tag Management System by downloading a JavaScript file from a URL. Second, the Tag Management System injects a GOOGLE ANALYTICS <script> tag which downloads another JavaScript file from a google.com URL. Third, the browser executes the GOOGLE ANALYTICS JavaScript, and a particular line of JavaScript code instructs the browser to create the "_ga" cookie using the browser-side API called document.cookie.

In this example, the "_ga" cookie has an initiator lineage of: 1) a page load, 2) a network request (Tag Management system JavaScript URL), 3) a network request (Google Analytics JavaScript URL), and 4) a JavaScript execution (GOOGLE ANALYTICS JavaScript line of code, including line and column number). The computer system 100 creates an initiator snapshot by intercepting all network requests generated by web pages, identifying all cookie mutation events, and then associating all the network requests which participated in the mutation (create, update, delete event) of any cookie on the page.

Multiple initiators are able to cause mutation events to the same cookie. To account for this, the computer system 100 generates, from the first cookie snapshot and the first initiator snapshot, a tree structure that allows it to represent multiple initiators for any single cookie and also stores relationships between multiple initiators. In at least one embodiment, this tree structure comprises a directed acyclic graph, referred to herein as a "initiator directed acyclic graph." The computer system 100 can store the initiator directed acyclic graph within the acyclic graph database 214. In at least one embodiment, the acyclic graph database 214 comprises the same database as the snapshot database 212.

A directed acyclic graph, also known as a directed acyclic graph (DAG), is a type of graph that consists of vertices connected by directed edges, where there are no directed cycles present. The directed edges indicate a one-way connection between vertices, going from a source vertex to a target vertex. The absence of cycles means that you cannot traverse the graph and return to the same node by following the directed edges. Acyclic graphs enable the representation of tasks, modules, or components in a way that ensures dependencies are resolved in the correct order without introducing circular dependencies. Acyclic graphs can also be topologically ordered, meaning the vertices can be linearly ordered such that for every directed edge from vertex A to vertex B, A appears before B in the ordering. This topological ordering is valuable in scenarios where the sequence of steps or activities needs to be determined based on their dependencies.

Using the initiator directed acyclic graph, the computer system 100 displays to a user information on a link between a particular cookie and a particular initiator. This produces a view of cookie data that informs users of exactly where their cookies came from, even if multiple technology vendors were involved (directly or indirectly) in the cookie creation.

Figure 3A:
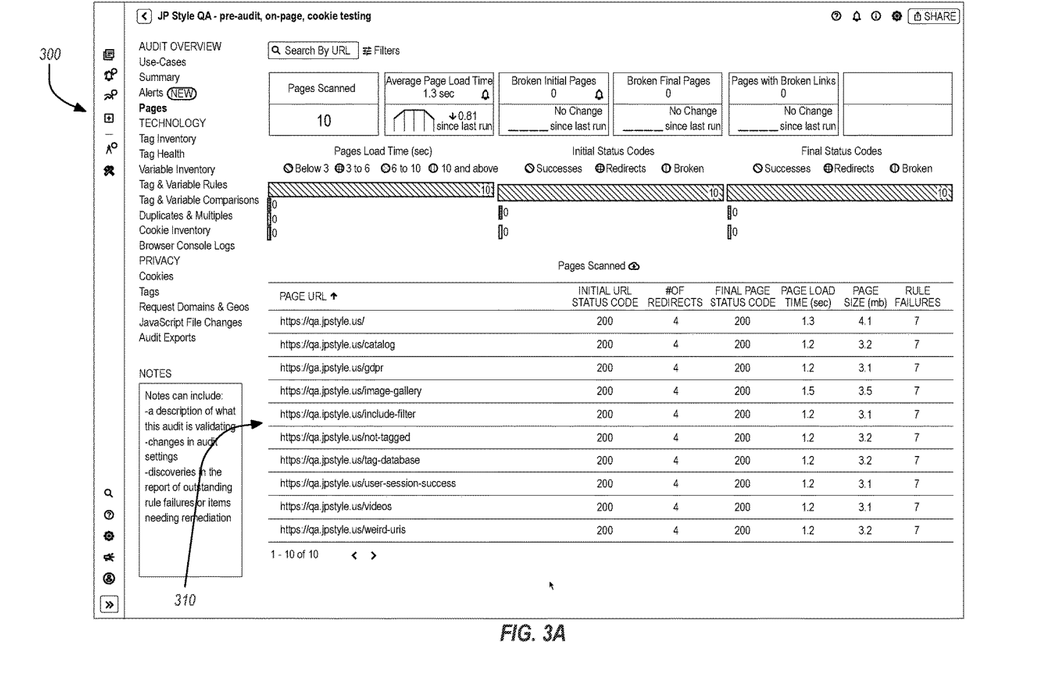
Figure 3C:
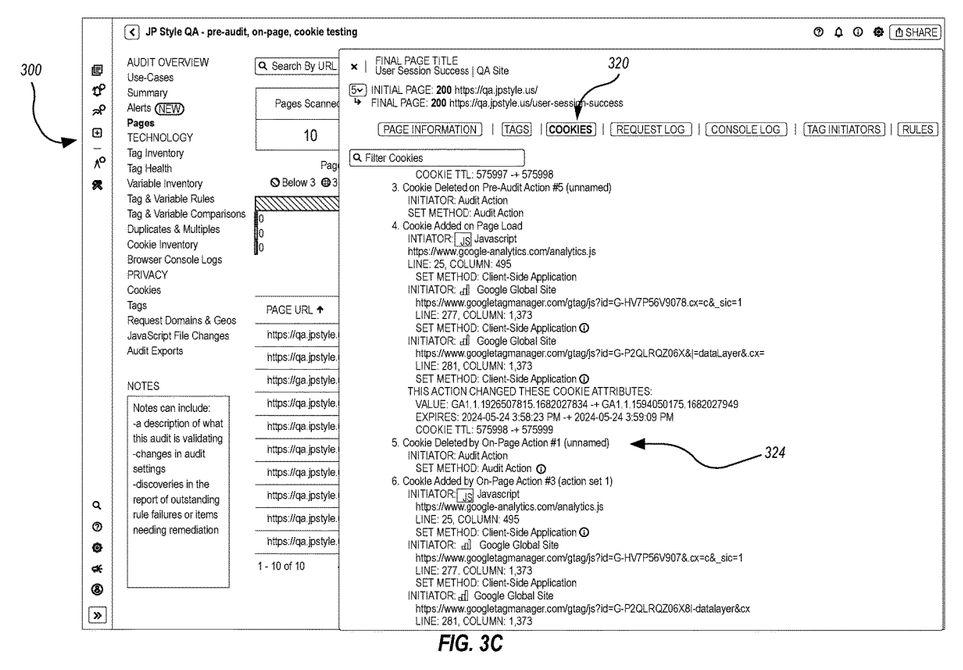

FIGS. 3A-3C illustrates a sequence of exemplary user interfaces 300 for origin detection for webpage cookies. In FIG. 3A, the user interface 300 displays a list of page URLs 310 that were loaded from a website during a cookie audit process performed by computer system 100. FIG. 3B depicts the user interface 300 after a particular website has been selected from the list of page URLs 310. Additionally, in FIG. 3B a "cookies" tab 320 has been selected. The resulting user interface 300 displays an origin story of one or more cookies that were loaded into the web browser from the webpage.

In the depicted example, the "_ga" cookie is the first listed cookie in the user interface 300. The user interface 300 shows a summary 322 of the "final existing cookie attributes" for the _ga cookie. For example, the summary 322 shows a cookie value, domain, expiration, http status, same site status, security status, and whether the cookie is $1^{st}$ party or $3^{rd}$ party. Additionally, the cookies tab 320 displays a origin story for the cookie. Additional portions of the origin story are shown in FIG. 3C. The origin story indicates that there were a total of 17 initiators and 7 actions. The cookies tab 320 further shows each initiator, the type of initiator, the line and column where the initiator is located, and a set-method for each initiator.

As shown in FIG. 3C, the cookies tab 320 can also display actions 324 that impact a cookie value or status. For example, action 324 comprises an on-page action that deleted the cookie. This action may be associated with a user on the web page clicking a button asking the webpage to not track their activities or selecting an option denying the webpage's request to use cookies.

In at least one embodiment, the executable instructions within the computer system 100 include instructions that are executable to configure the computer system 100 to cause a simulated action to occur to a user input on the webpage. For example, a website administrator may wish to verify that when a user selects a webpage option to delete cookies, the cookies are then in fact deleted. Accordingly, the website administrator can write a script or use a mouse-input recording system to create a simulated user input on a particular webpage within the website. The simulated user input may comprise a mouse click on a webpage button that requests that the website not track the user. The simulated user input can be embedded in multiple locations within the cookie audit process for a website. For example, the website administrator may wish to insert the simulated user input into multiple locations within the webpage rendering to verify that the user's request will be honored without regard to when the user clicks the button.

In at least one embodiment, when a simulated action is executed on a webpage by the computer system 100, the computer system 100 creates another cookie snapshot comprising updates to the one or more cookies and creates another initiator snapshot comprising updates to the one or more initiators for each cookie. Accordingly, each simulated input may prompt the computer system 100 to create new snap shots that can be analyzed specifically to determine all changes to the cookies that were caused by the simulated user input.

Once the responses to the simulated user input are stored in one or more snapshots, the computer system 100 can add information from the second cookie snapshot and the second initiator snapshot to the initiator directed acyclic graph. Similarly, the computer system 100 can add information relating to the simulated action to the initiator directed acyclic graph. The computer system 100 can then identify one or more differences between earlier snapshots and the later snapshots. Using these identified differences, as shown in FIG. 3C, the computer system 100 displays information, from the initiator directed acyclic graph, on the one or more differences.

In at least one embodiment, the rendering engine 210 can also load a user persona that comprises one or more attributes stored within the browser. Before loading a webpage, a user can load a user persona into the web browser. A user persona comprises various pre-stored data that describes attributes of a simulated user. For example, the user persona may comprise pre-loaded cookies that indicate the simulated user is a minor who speaks French. When loading the webpage, various aspects of the page may respond differently based upon the user persona. For example, the webpage may render in French and may restrict the user's ability to make payments on the webpage due to the user's minor status.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
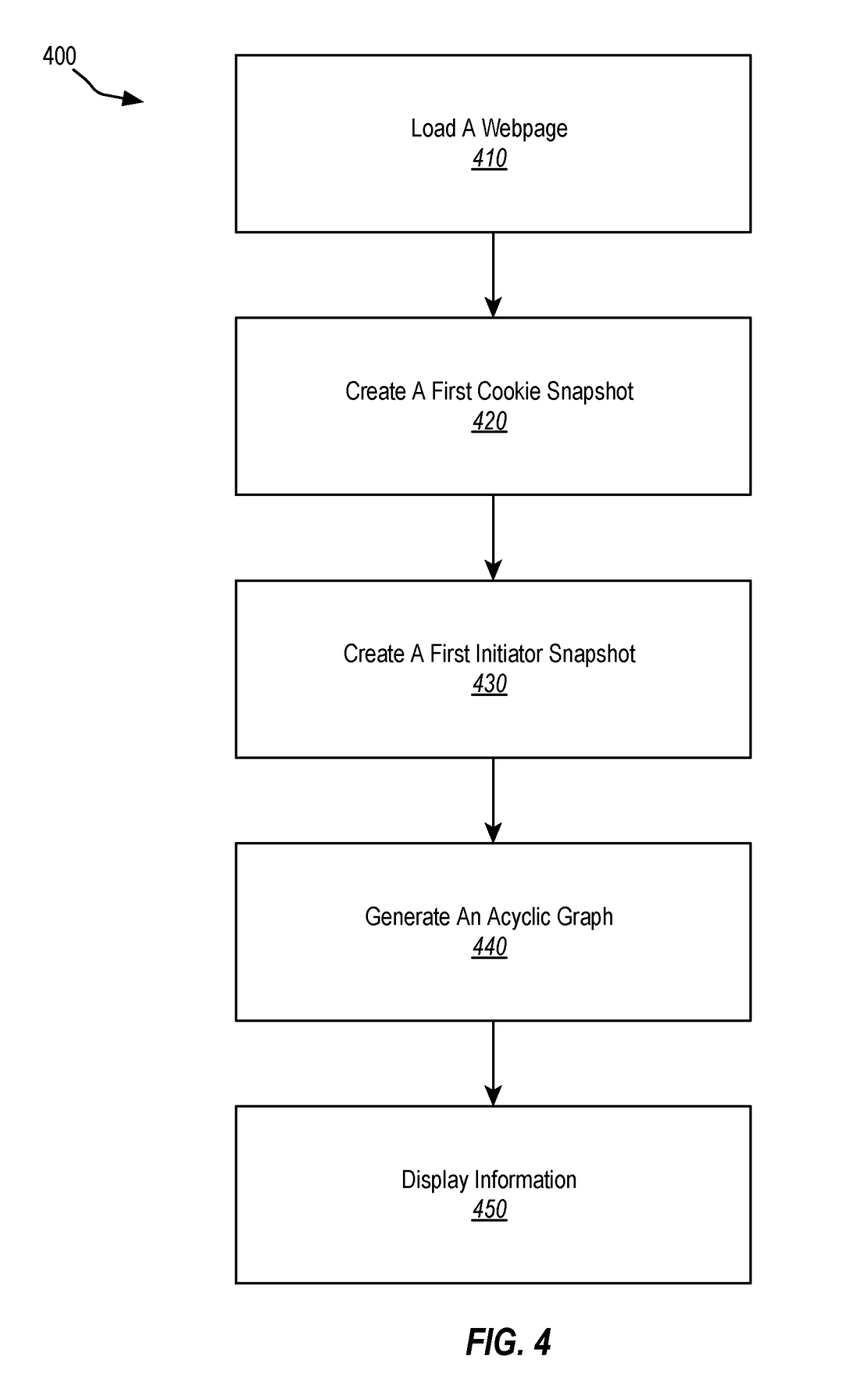
FIG. 4 illustrates a flowchart of a method for origin detection for webpage cookies.

Referring now to FIG. 4, a method 400 for origin detection for webpage cookies is illustrated. Method 400 includes an act 410 of loading a webpage. Act 410 comprises loading a webpage, wherein loading the webpage causes a browser to store one or more cookies. For example, the rendering engine 210 can load a webpage from a webserver 120. Loading the webpage, causes various cookies to be stored in a local browser at the computer system 100.

Additionally, method 400 can include an act 420 of creating a first cookie snapshot. Act 420 comprises creating a first cookie snapshot of the one or more cookies. For example, the rendering engine 210 can periodically create a cookie snapshot of all current cookie statuses and store the snapshot in the snapshot database 212.

Method 400 can also include an act 430 of creating a first initiator snapshot. Act 430 comprises creating a first initiator snapshot of the one or more initiators. For example, the rendering engine 210 can periodically create an initiator snapshot of all current initiator statuses and store the snapshot in the snapshot database 212.

In addition, method 400 can include an act 440 of generating an acyclic graph. Act 440 comprises generating, from the first cookie snapshot and the first initiator snapshot, an initiator directed acyclic graph. For example, the computer system 100 can link the various initiators to their respective cookies and create an initiator directed acyclic graph. The computer system 100 can store the initiator directed acyclic graph within the acyclic graph database 214.

Further, method 400 can include an act 450 of displaying information. Act 450 comprises displaying information, from the initiator directed acyclic graph, on a link between a particular cookie and a particular initiator. For example, FIGS. 3A-3C display a user interface 300 for displaying information from the initiator directed acyclic graph. The information includes an origin story for one or more cookies. The origin story describes the creation of the cookie and subsequent steps that modified the cookie.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

Many computers are intended to be used by direct user interaction with the computer. As such, computers have input hardware and software user interfaces to facilitate user interaction. For example, a modern general purpose computer may include a keyboard, mouse, touchpad, camera, etc. for allowing a user to input data into the computer. In addition, various software user interfaces may be available.

Examples of software user interfaces include graphical user interfaces, text command line based user interface, function key or hot key user interfaces, and the like.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAS, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for origin detection for webpage cookies, comprising:
   one or more processors; and
   one or more computer-readable media having stored thereon executable instructions that when executed by the one or more processors configure the computer system to:
   load a webpage, wherein loading the webpage causes a browser to store one or more cookies;
   create a first cookie snapshot of the one or more cookies;
   create a first initiator snapshot of one or more initiators for each cookie;
   generate, from the first cookie snapshot and the first initiator snapshot, an initiator directed acyclic graph; and
   display information, from the initiator directed acyclic graph, on a link between a particular cookie and a particular initiator.

2. The computer system of claim 1, wherein the executable instructions include instructions that are executable to configure the computer system to cause a simulated action to occur to a user input on the webpage.

3. The computer system of claim 2, wherein the executable instructions include instructions that are executable to configure the computer system to, in response to the simulated action occurring, create a second cookie snapshot comprising updates to the one or more cookies and create a second initiator snapshot comprising updates to the one or more initiators for each cookie.

4. The computer system of claim 3, wherein the executable instructions include instructions that are executable to configure the computer system to add information from the second cookie snapshot and the second initiator snapshot to the initiator directed acyclic graph.

5. The computer system of claim 4, wherein the executable instructions include instructions that are executable to configure the computer system to add information relating to the simulated action to the initiator directed acyclic graph.

6. The computer system of claim 5, wherein the executable instructions include instructions that are executable to configure the computer system to:
   identify one or more differences between the first cookie snapshot and the second cookie snapshot; and
   display information, from the initiator directed acyclic graph, on the one or more differences.

7. The computer system of claim 1, wherein first cookie snapshot and the first initiator snapshot are stored within a single file.

8. The computer system of claim 1, wherein the executable instructions to create the first cookie snapshot includes instructions that are executable to configure the computer system to receive from a cookie-creation application programming interface (API) an indication that a cookie has been created.

9. The computer system of claim 1, wherein the executable instructions to create the first cookie snapshot include instructions that are executable to configure the computer system to:
   intercept a network communication made in response to code executing on the webpage;
   identify, within the network communication, a fingerprint of a server-created cookie; and
   add information about the server-created cookie to the first cookie snapshot.

10. The computer system of claim 1, wherein the executable instructions include instructions that are executable to configure the computer system to:
   before loading the webpage, load a user persona that comprises one or more attributes stored within the browser.

11. A computer-implemented method, executed on one or more processors, for origin detection for webpage cookies, the computer-implemented method comprising:
   loading a webpage, wherein loading the webpage causes a browser to store one or more cookies;
   creating a first cookie snapshot of the one or more cookies;
   creating a first initiator snapshot of one or more initiators for each cookie;
   generating, from the first cookie snapshot and the first initiator snapshot, an initiator directed acyclic graph; and
   displaying information, from the initiator directed acyclic graph, on a link between a particular cookie and a particular initiator.

12. The computer-implemented method of claim 11, further comprising causing a simulated action to occur to a user input on the webpage.

13. The computer-implemented method of claim 12, further comprising, in response to the simulated action occurring, creating a second cookie snapshot comprising updates to the one or more cookies and create a second initiator snapshot comprising updates to the one or more initiators for each cookie.

14. The computer-implemented method of claim 13, further comprising adding information from the second cookie snapshot and the second initiator snapshot to the initiator directed acyclic graph.

15. The computer-implemented method of claim 14, further comprising adding information relating to the simulated action to the initiator directed acyclic graph.

16. The computer-implemented method of claim 15, further comprising:
   identifying one or more differences between the first cookie snapshot and the second cookie snapshot; and
   displaying information, from the initiator directed acyclic graph, on the one or more differences.

17. The computer-implemented method of claim 11, wherein first cookie snapshot and the first initiator snapshot are stored within a single file.

18. The computer-implemented method of claim 11, further comprising receiving from a cookie-creation application programming interface (API) an indication that a cookie has been created.

19. The computer-implemented method of claim 11, further comprising:
   intercepting a network communication made in response to code executing on the webpage;
   identifying, within the network communication, a fingerprint of a server-created cookie; and
   adding information about the server-created cookie to the first cookie snapshot.

20. A computer-readable media comprising one or more physical computer-readable storage media having stored thereon computer-executable instructions that, when executed at a processor, cause a computer system to perform a method for origin detection for webpage cookies, the method comprising:
   loading a webpage, wherein loading the webpage causes a browser to store one or more cookies;
   creating a first cookie snapshot of the one or more cookies;
   creating a first initiator snapshot of one or more initiators for each cookie;
   generating, from the first cookie snapshot and the first initiator snapshot, an initiator directed acyclic graph; and
   displaying information, from the initiator directed acyclic graph, on a link between a particular cookie and a particular initiator.

* * * * *